United States Patent [19]

Heckethorn et al.

[11] 4,393,559

[45] Jul. 19, 1983

[54] U-BOLT CLAMP WITH TUBULAR REINFORCING MEANS

[75] Inventors: John E. Heckethorn, Dyersburg; Danny J. Whittle, Newbern, both of Tenn.

[73] Assignee: Heckethorn Manufacturing Company, Dyersburg, Tenn.

[21] Appl. No.: 283,237

[22] Filed: Jul. 14, 1981

[51] Int. Cl.³ .............................................. B65D 63/00
[52] U.S. Cl. ........................................ 24/277; 285/199; 285/382.2
[58] Field of Search .............. 24/277, 276, 275, 243 E; 248/62, 74.1; 285/199, 253, 382.2, 420

[56] References Cited

U.S. PATENT DOCUMENTS

| | | | |
|---|---|---|---|
| 2,993,255 | 7/1961 | Jagiel | 24/277 |
| 3,137,053 | 6/1964 | Osborn et al. | 24/277 |
| 3,209,426 | 10/1965 | Vlasak et al. | 24/277 |
| 3,729,782 | 5/1973 | Downing | 24/277 |
| 4,056,869 | 11/1977 | Eisma, Jr. | 24/277 |
| 4,063,336 | 12/1977 | Jones et al. | 24/277 |
| 4,147,384 | 4/1979 | Heckethorn | 24/277 |
| 4,229,863 | 10/1980 | Bowden et al. | 24/277 |
| 4,265,005 | 5/1981 | Heckethorn | 24/277 |

*Primary Examiner*—John J. Wilson
*Attorney, Agent, or Firm*—Dennison, Meserole, Pollack & Scheiner

[57] ABSTRACT

A new saddle construction for a U-bolt pipe clamp assembly formed from a single blank of sheet steel without welding and including a tubular cross reinforcement rib of preferably triangular cross section spanning the top of the saddle completely between the two bolt receiving housings. The saddle is formed in a progressive die and is adapted in conjunction with its mating U-bolt to indent a circumferential bead in the pipe sections being joined.

7 Claims, 17 Drawing Figures

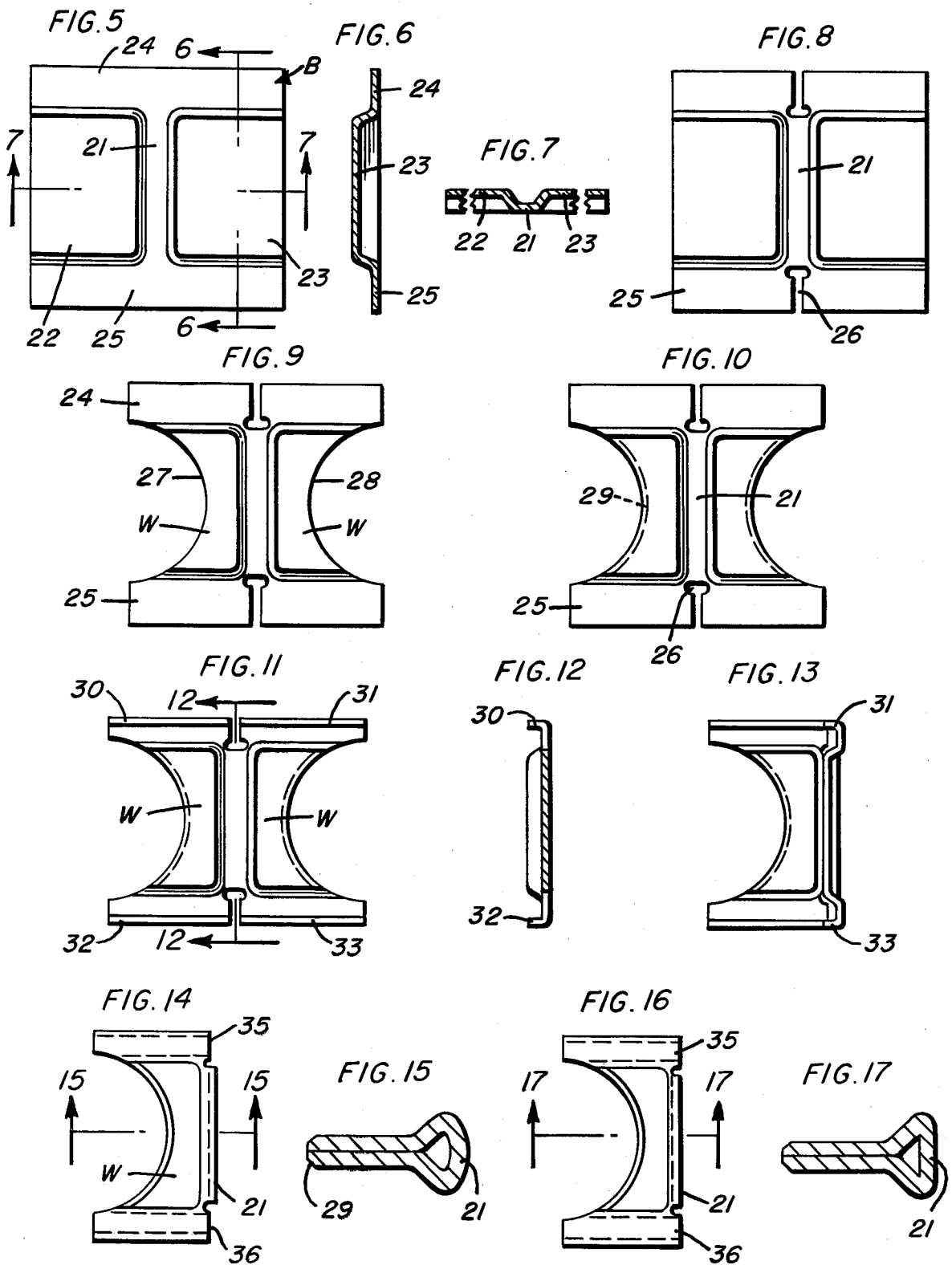

U-BOLT CLAMP WITH TUBULAR REINFORCING MEANS

BACKGROUND AND PRIOR ART

The general field of this invention is directed to the art of U-bolt saddle clamps which are employed for example in the exhaust system and elsewhere in automobiles and trucks powered by internal combustion engines. Clamps of this type also find utility in the building and construction industry for hanging of overhead pipes and also in the construction of tubular towers and antennas for example.

The known prior art directly concerned with such clamps is for the most part derived from a basic assembly comprising a U-shaped bolt that is threaded at its ends and has a generally semi-circular bight portion integrally connecting a pair of parallel legs which mount, in axially slidable relation, a sheet metal saddle member which member includes tubular portions that receive and house the bolt legs of the U-bolt, and which are connected by a central web portion extending transversely between the tubular housings and being integral therewith. The saddle has a work engaging edge facing which is arcuate and has the same radius as the U-bolt bight. Nuts are fitted on the threaded free end portions of the U-bolt legs which are then torqued against the adjacent ends of the tubular housing to bring the saddle and the bolt together for tightly clamping a pair of telescoped cylindrical tubes which are disposed between the bight of the U-bolt and the arcuate edge of the saddle member. On occasion, lock washers are interposed between the nuts and the ends of the tubular housings. In other applications, a hanger bracket of the type set forth in the copending application of John E. Heckethorn, Ser. No. 188,262, filed Sept. 17, 1980, now U.S. Pat. No. 4,372,017, is interposed between the top face of the saddle and the face of the nut members. In this manner, the entire assembly can be supported from the hanger bracket which is secured to the frame of the vehicle.

Typical examples of prior art structures of this general type are illustrated by Riker U.S. Pat. No. 2,719,345; Osborne et al U.S. Pat. No. 3,137,053; Heckethorn, U.S. Pat. No. 3,955,250; Downing, U.S. Pat. No. 3,729,782; and Heckethorn, U.S. Pat. No. 4,265,005. Additional examples of recent U-bolt clamp assembly patents are shown in Eisma, U.S. Pat. No. 4,056,869 and Wagner U.S. Pat. No. 4,183,122. In most of the prior art devices, the saddles are formed from initially planar oblong blanks formed of relatively thin sheet steel. The blanks are cut, stamped, rolled or otherwise formed to provide a central web connecting a pair of tubular portions which are arranged to slide axially on the legs of an associated U-bolt. In some of the patents, as for example Eisma and Wagner, the saddle web is formed of but a single sheet of material appropriately bent over to form additional thickness. In others, as for example Heckethorn U.S. Pat. No. 3,955,520 and Riker U.S. Pat. No. 2,719,345, the web is formed of a pair of substantially identical sheets joined in parallel face to face contact. In others such as Downing the web is formed from a single piece or several pieces of blank material folded to provide laterally spaced faces.

In modern usage especially in the automotive industry, the pipe-engaging edge of the saddle is required to impart sufficient clamping pressure on the telescoping pipe sections to which it is applied so as to indent a semi-circular bead therein. This bead prevents axial separation of the pipe elements. The applied clamping pressure is a function of the torque level to which the securing nuts are finally tightened when they are drawn up on the threaded ends of the U-bolt legs during assembly. It appears to be essential that there be some longitudinal reinforcement in the saddle member since tests have shown that in prior art clamps as in Riker where the saddle webs have no such longitudinal reinforcement the saddles will commence to twist laterally and roll over when tightened to torque levels approaching 20 ft/lbs. Of course, clamp saddles having longitudinally reinforcing means such as Downing et al successfully resist such twisting and rolling at much higher torque levels, as for example 30 ft/lbs. In recent years, even more rigid clamps have been developed as noted in Heckethorn, U.S. Pat. No. 3,955,250 and 4,265,005.

The trend in recent years has been to design clamps of this type which will withstand high torque values and yet which will result in economies of manufacture and in weight. Since four or more clamps are frequently used in a single vehicle, the economies to be achieved by even a slight reduction in cost and in weight may be significant.

SUMMARY OF THE INVENTION

We have provided a new U-bolt saddle clamp which is formed without welding from a single blank of steel, preferably constructed using a progressive die. The saddle when assembled includes tubular reinforcing means extending substantially from the one bolt opening to the other bolt opening along the top portion of the saddle web and in the preferred form the tubular reinforcing means is of generally triangular cross section. The upper surface of the saddle is flat across its entire area which permits the mounting on a conventional hanger bracket. The wide flat surface allows the hanger bracket to be seated snugly against the saddle. The entire assembly is adapted to meet the low profile requirements of present automotive construction as the web height can be as little as $\frac{3}{8}''$. The new clamp provides nearly uniform indentation around 360° circumference of the interconnected telescoped pipe members on which it is applied, and the new assembly is especially strong and rigid.

It is an object of our invention to provide a pipe joint clamp having a novel reinforcing means integral therewith and of tubular cross section.

Another object of the invention is to provide a novel saddle web for a U-bolt clamp including integral reinforcing means which is formed of but a single sheet of steel formed in a progressive die without welding.

Another object of the invention is to provide a new clamp assembly which may be used with a conventional hanger bracket and which includes tubular reinforcing means of preferably triangular cross section which extends from one bolt opening to the other along the top portion of the saddle web. Yet other objects of the invention are to provide a U-bolt clamp arrangement which will provide leak tight sealing engagement by means of an arcuate bead indentation substantially throughout the circumference of the tubing.

A still further object of our invention is the provision of a U-bolt saddle web clamp which may be economically manufactured in large quantities from sheet steel and from rod stock and which is simple and safe in use.

Further objects and advantages will become apparent from a consideration of the following drawings and detailed description.

DESCRIPTION OF THE DRAWINGS

FIGS. 5-17 show the die progression stages wherein FIG. 5 shows the blank after the first forming wherein the inner side of the bolt openings and the reinforcing rib section are formed. FIG. 6 is a sectional view taken along the line 6—6 of FIG. 5.

FIG. 7 is a sectional view taken along the line 7—7 of FIG. 5.

FIG. 8 is a view of the blank of FIG. 5 after notching.

FIG. 9 shows the blank with the subsequent step of the formation of the radii.

FIG. 10 shows the subsequent step of coining the edge of the radii to provide a relatively tapered or beveled edge.

FIG. 11 shows the blank of FIG. 10 with the outer edges formed up.

FIG. 12 is a sectional view taken along line 12—12 of FIG. 11.

FIG. 13 shows the subsequent step of making the first 90° bent along the center line of the blank.

FIG. 14 shows the completion of the bend wherein an additional 90° bend is provided.

FIG. 15 is an enlarged section taken along line 15—15 of FIG. 14.

FIG. 16 shows the final step of saddle formation wherein the right side edge of FIG. 14 has been restruck to flatten it flush with the nut seats.

FIG. 17 is an enlarged section taken along the line 17—17 of FIG. 16.

DETAILED DESCRIPTION

Figure 1:
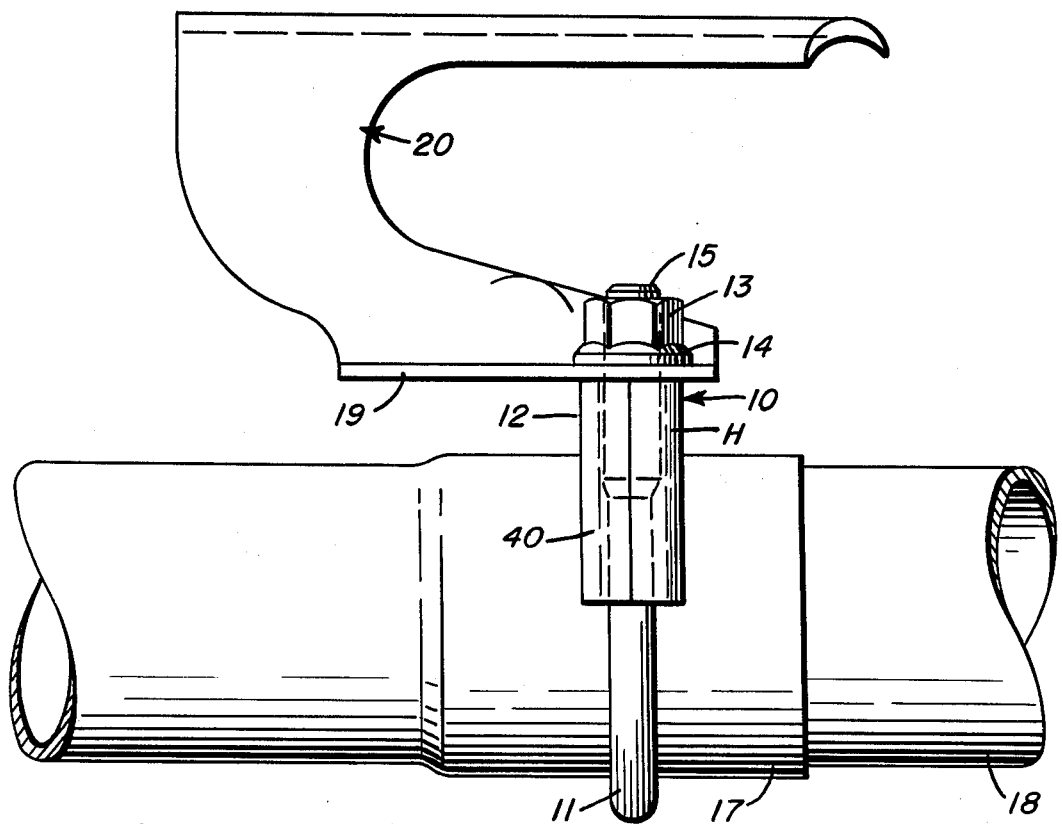
FIG. 1 is a side elevation of the clamp of our present invention installed on a coupled section of pipe.

The composite assembly disclosed herein consists of only four parts which constitute the U-bolt clamp shown generally in the drawings at 10. The component parts include a standard U-bolt 11, the new saddle member 12, and two securing nuts 13 which may have integral washer flange portions 14 thereon. The nuts are engaged on the threaded free ends 15 of the U-bolt, each of which extend in substantially parallel relation from the bight portion 16 of the U-bolt.

Figure 2:
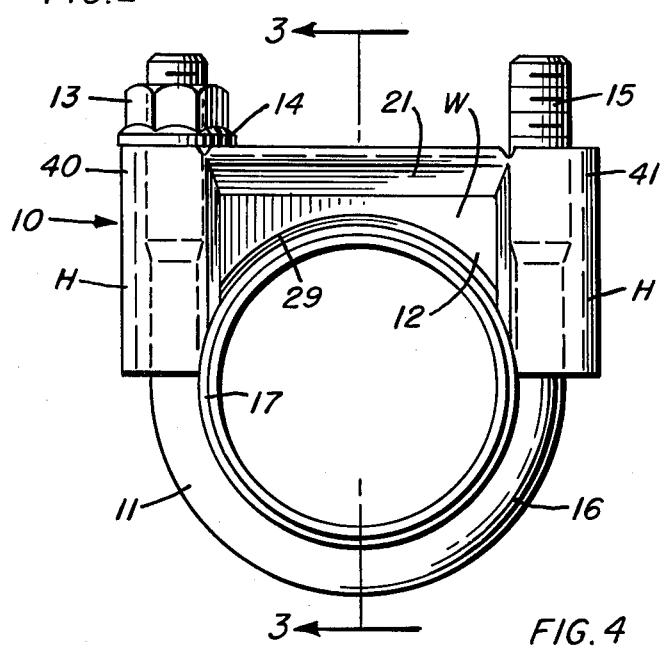
FIG. 2 is a front view of the elements of the clamp installed on a coupled section of pipe and showing a single nut engaged on one of the U-bolt legs.
Figure 3:
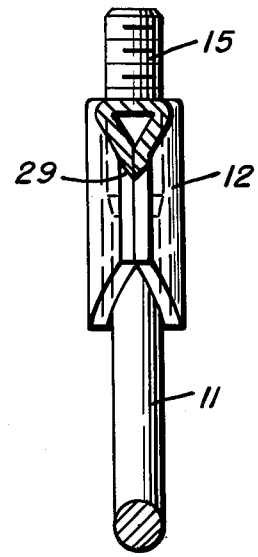
FIG. 3 is a vertical cross-section taken along the lines 3—3 of FIG. 2 but omitting the pipe sections.

As can be seen in FIGS. 1-3, the saddle member 12 is slidable axially on the legs of the U-bolt between the nuts 13 and the bight portion 16. In installation, a coupling of telescoped pipe sections 17 and 18, one of which may be the outlet of a vehicle muffler, is compressed between the saddle 12 and the bight portion 16 of the U-bolt when the saddle is moved toward the bight under the force of the nuts 13 as they are torqued up on the legs. In order to provide a uniform bead about the telescoped pipe sections, it is essential that the U-bolt be carefully made to ensure a nearly perfect arcuate bight portion. Similarly, care must be exercised in manufacture of the saddle to ensure that the arcuate edge conforms to that of the bight portion 16.

In some applications, the U-bolt clamp assembly 10 can also serve as a hanger for one section of the exhaust system, and in such instances the ends of the U-bolt 15 pass through holes in flanges 19 of a hanger horn assembly 20 which is of conventional design and which may be shock mounted to the under body of the vehicle. The horn is not part of the present invention but is indicated generally in FIG. 1. The device may also be used without the horn and FIG. 2 shows the assembly in this manner.

The saddle member 12 of the present disclosure can be fabricated of any acceptable material and is preferably formed of a low carbon high strength steel. It has also been found by applicants that forming the saddle utilizing progressive die techniques has numerous advantages and results in production of a saddle member having precise tolerances and results in great economies in manufacture.

Specific attention is directed to sheet 2 of the drawings and particularly FIGS. 5-17 therein. Blanking and forming of the saddle can be accomplished in eight steps or stages utilizing a progressive die although the exact number of stages is not critical with respect to the invention. The strip steel from which the saddle is made is cut into connecting rectangular segments and each segment is then subjected to blanking and forming steps which are incorporated in the progressive die. The first step as shown in FIG. 5 is the first form. Here, the inner side of the bolt housings H are formed as well as the central reinforcing rib section. The blank is shown as B and the reinforcing rib section is designated at 21. It will be noted that two depressed rectangular areas 22 and 23 are formed thereby and side flanges 24 and 25 are further provided. From FIG. 6 it will be noted that the side walls extending from the depressed areas 22 and 23 are steeply sloped to the reinforcing rib 21 and the side flanges 24 and 25.

The next step in formation of the saddle involves notching of the first form as shown in FIG. 8. The notches as shown at 26 extend from the side flange edge to the reinforcing rib 21. The T-shape with the edges of the cross portion being arcuate are particularly important for the proper formation of the nut seats as will later be apparent.

The radius cuts are next made on each of the sides of the blank as shown in FIG. 9 to provide a proper matching radius for the tubing joint to which it is applied. It will be noted that the radius cuts 27 and 28 extend through the sloping side walls of the areas 22 and 23 and into the side flanges 24 and 25 which of course will provide the bolt housings H.

The edges of the radii 27 and 28 are next coined on one side as shown in the hidden lines 29 in FIG. 10. This provides a chamfer and thins the edge to improve penetration into the pipe as can be best seen in the assembly view of FIG. 3. These tapered edges when the blank is finally folded provide a relatively sharp penetration radius which coacts with the inner radius of the U-bolt to provide the necessary bead in the pipe.

The next step as shown best in FIGS. 11 and 12 involves forming up the outer edges of the flange portions 24 and 25 to provide the necessary half box configuration for the bolt housing. Note the upturned edges 30, 31, 32, and 33.

Figure 4:
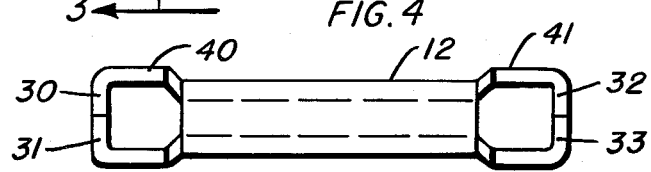
FIG. 4 is a top view of the web saddle subassembly.

The first 90° bend of the entire blank is shown in the subsequent step depicted in FIG. 13. Here the blank is turned upwardly along the edge of the triangular reinforcing rib 21, as shown to the left of section line 12—12 in FIG. 11, to form a 90° bend. This is followed by the second 90° bend shown in FIG. 14 wherein the blank is bent over the full 180° so that the two halves are in face-to-face contact providing the basic shape of the finished saddle assembly. Note that the upturned portions 30 and 31 will mate as shown best in the assembly view of FIG. 4 and also the portions 32 and 33 will be in full line contact. The central web portion of the saddle shown at W will also be in face-to-face contact and joined with the tapered portions 29 as shown in FIG. 3, the edges of radii 27 and 28 forming an arcuate lower edge. It will be noted that the reinforcing rib 21 at this phase of the construction has its longitudinal edge extendng slightly outwardly from the plane of the nut seats shown at 35 and 36. In fact, the rib 21 at this point takes on a slightly curved cross sectional configuration as shown in FIG. 15 necessitating restriking which is accomplished by confining the entire subassembly and spanking the reinforcing rib utilizing a cam operated punch. By striking the rib 21 it will then assume the final configuration of FIG. 17 wherein the face of the reinforcing rib is flush with the nut seats 35 and 36 and the cross sectional configuration is triangular as shown in FIG. 17. A planar top face is formed between two verticals of the triangle and as shown the third vertex is located between the top face and the arcuate lower edge.

It would be obvious that other progressions within the die would also stamp the part with any required logo or part number and would trim the edges of the strip.

It is of course the reinforcing rib which is shown in the preferred embodiment as triangular which provides the very heavy reinforcement necessary for proper utilization of our new clamp.

It will be apparent that the tubular reinforcing means of the clamp extend substantially from one bolt opening or housing 40 to the other 41. While the tubular reinforcing means is shown as triangular in cross section it is within the scope of this invention to provide also a cross section which may be round, semiround or even square.

OPERATION

The operation of the clamp assembly will be readily apparent to one skilled in the art and when the saddle member 12 is mounted on the legs 15 of the U-bolt with a telescoped coupling of two metal tubes 17 and 18 disposed between the semicircular recess in the bottom edge of the saddle web and the bight 16 of the U-bolt, the clamp is then tightened by drawing up of the securing nuts 13 to advance the U-bolt axially with respect to the saddle member to thereby compress the coupling and provide a circular head indentation therein and thereby provide a fluid tight seal over the full 360° of the joint. Of course the greater the total thickness of the telescoped coupling the higher will be the torque required to draw up the securing nuts so that the clamp will indent a fully leak-proof bead in the coupling.

Our new clamp is particularly effective for use with hanger brackets of the type shown at 20 in FIG. 1. The new saddle member provides a wide, flat surface for the hanger bracket to seat against and the combination can meet the low profile requirements, as the web height can be as low as ⅜".

Clamp saddles fabricated in accordance with the present disclosure will withstand very high torque and are not readily subject to distortion and additionally have provided very high degrees of gas tightness and prevent leakage.

A force applied against the upper face of the triangular reinforcing rib 21 will result in force vectors acting inwardly along the sides of the triangle, forcing the webs more tightly together.

We claim:

1. A U-bolt clamp saddle body formed from a single folded blank of sheet metal, including a pair of spaced parallel U-bolt leg receiving housings, a central web section having an arcuate lower edge extending between said housing, and an integral tubular reinforcing rib extending from one said housing to the other on said web and forming the top face thereof, said reinforcing rib being of triangular cross section and having a planar top face between two of the verticies defined by said triangular cross section, the third vertex defined by said triangular cross section of said rib being located between the top face and said arcuate lower edge.

2. A U-bolt clamp saddle as defined in either of claims 1 wherein the ends of the housings serve as nut seats and said reinforcing rib is flush with the said ends to provide a flat continuous upper saddle face.

3. A U-bolt clamp saddle as defined in claim 2 wherein the width of said reinforcing rib is less than the width of said housings.

4. A U-bolt clamp saddle as defined in claim 1 wherein the blank is formed with a progressive die and is folded along the lines defining the top edges of the reinforcing section.

5. A U-bolt clamp saddle as defined in claim 1, wherein said edge is chamfered.

6. A U-bolt clamp assembly comprising a U-bolt having an arcuate bight portion and two spaced parallel legs, the top portions of which are threaded, a saddle body formed from a single folded blank of sheet metal and having a pair of spaced parallel elongated housings receiving the legs of the U-bolt therethrough, a central web section having an arcuate lower edge and having the same radius as said bight portion of the U-bolt and extending between said housings, and an integral tubular reinforcing rib extending from one said housing to the other on said web and forming the top face thereof, said reinforcing rib being of triangular cross section and having a planar top face between two of the verticies defined by said triangular cross section, the third vertex defined by said triangular cross section of said rib being located between the top face and said arcuate lower edge, said assembly being adapted to receive a pair of telescoped pipe sections therein, and nut means threaded on said U-bolt leg threaded portions.

7. A U-bolt clamp assembly as defined in either claim 6 wherein said reinforcing rib is flush with the ends of said elongated housings.

* * * * *

UNITED STATES PATENT AND TRADEMARK OFFICE
CERTIFICATE OF CORRECTION

PATENT NO. : 4,393,559

DATED : July 19, 1983

INVENTOR(S) : John E. Heckethorn and Danny J. Whittle

It is certified that error appears in the above-identified patent and that said Letters Patent are hereby corrected as shown below:

Column 6, line 5 of claim 1, "housing" should be -- housings -- line 1 of claim 2, "either of claims" should be -- claim -- line 1 of claim 7, "either" should be deleted.

Signed and Sealed this

Seventh Day of February 1984

[SEAL]

Attest:

Attesting Officer

GERALD J. MOSSINGHOFF

Commissioner of Patents and Trademarks